Aug. 22, 1967　　　　　J. F. GILEWSKI　　　　　3,337,024
CONVEYOR PARTICULARLY ADAPTED FOR BUFFING OPERATIONS
Filed Oct. 21, 1965
4 Sheets-Sheet 1
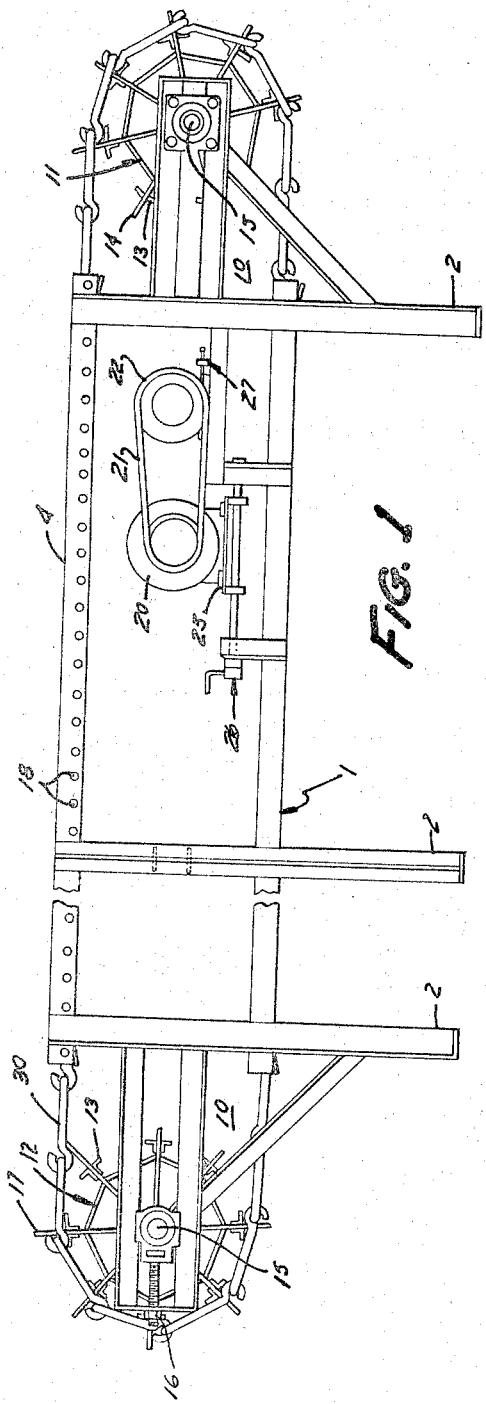
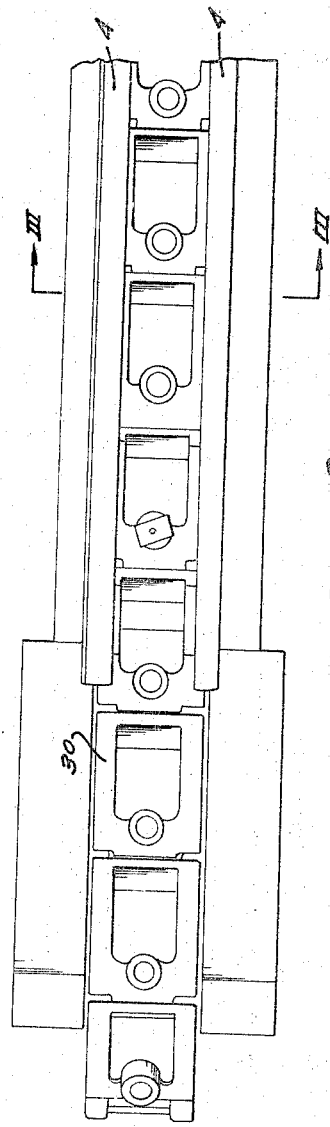
INVENTOR.
JOSEPH F. GILEWSKI
BY
ATTORNEYS

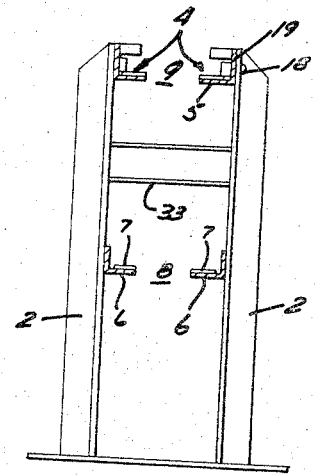
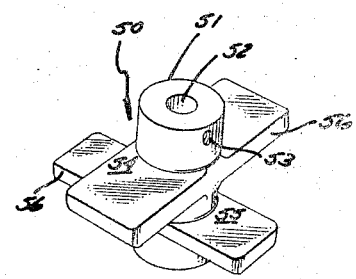
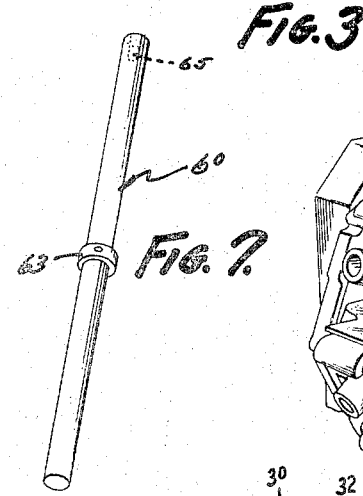
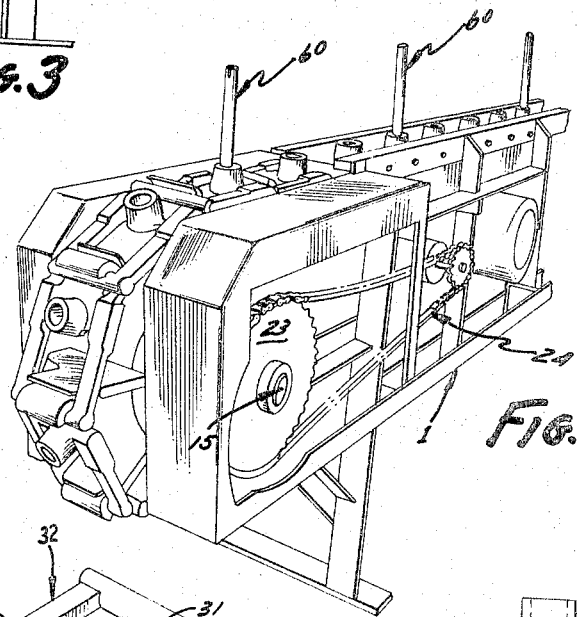
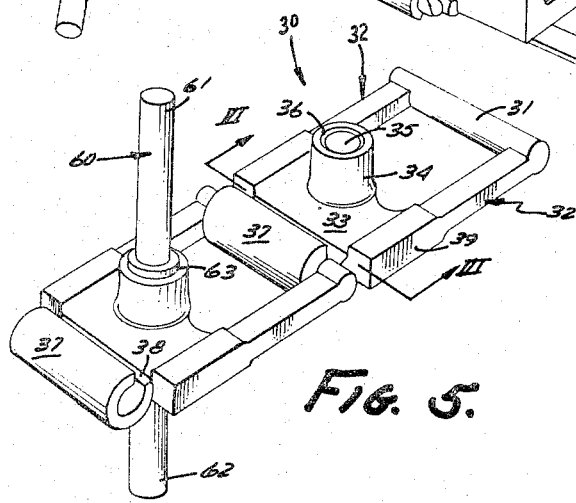
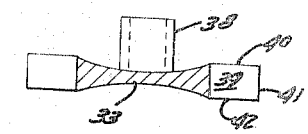
INVENTOR.
JOSEPH F. GILEWSKI Aug. 22, 1967  J. F. GILEWSKI  3,337,024
CONVEYOR PARTICULARLY ADAPTED FOR BUFFING OPERATIONS
Filed Oct. 21, 1965
4 Sheets-Sheet 4

INVENTOR.
JOSEPH F. GILEWSKI
BY
ATTORNEYS

United States Patent Office 3,337,024
Patented Aug. 22, 1967

3,337,024
CONVEYOR PARTICULARLY ADAPTED FOR BUFFING OPERATIONS
Joseph F. Gilewski, 1132 Lake Michigan Drive NW., Grand Rapids, Mich. 49504
Filed Oct. 21, 1965, Ser. No. 499,260
21 Claims. (Cl. 198—131)

This invention relates to conveyors and more particularly to conveyors specially adapted for use in sequential buffing operations.

Present modes of product fabrication often require assembly line buffing techniques. As a rule, such techniques consist of mounting the article to be buffed on some sort of a conveyor system and rotating the conveyor in such a manner that the article sequentially comes into contact with a number of buffing mechanisms. The conveyor systems which are currently utilized to perform this operation are commercially unsatisfactory in many respects. These systems generally consist of a pair of parallel rotating chains mounted in spaced relationship on a frame. A work bearing crosspiece is placed across the space and its ends are affixed to the chains. The articles to be buffed are then supported in some fashion on the work bearing crosspiece. These work bearing crosspieces which carry the article to be buffed have a tendency to tilt when the article comes into contact with the buffing mechanism. This tilting is highly undesirable since it not only interfers with the accuracy of the buffing operation but also causes much undue wear on the conveyor apparatus. The problem becomes particularly acute when large articles are being buffed since the weight of the article itself is often enough to place a maximum allowable stress on the conveyor apparatus.

Another problem often encountered in buffing conveyors currently in use is that no means are provided for positively positioning the work piece at a desired angle with respect to the buffing apparatus while still allowing the work piece to have some degree of rotational freedom. Since buffers ordinarily contact only one segment of the periphery of the work piece it is often desirable to rotate the work piece as it passes adjacent the buffer in order that a uniform finish may be obtained on all surfaces.

A similar problem exists in the inability of buffing conveyors currently in use to maintain a desired radial position of the work piece along a segment of the conveyor line and then automatically change that radial position to a new position and likewise maintain the work piece in that new position along another segment of the conveyor line.

It is an object of the invention to provide a buffing conveyor apparatus which is not subject to the above outlined disadvantages.

More particularly, it is an object of this invention to provide a buffing conveyor apparatus which affords accurate positioning of the work piece regardless of the tilting pressures incident to the buffing operation.

It is an object of this invention to provide a buffing conveyor apparatus whose conveyor belt sections will not twist or deform under the load of the twisting force incident to buffing only one side of the work piece.

It is an object of this invention to provide a conveyor buffing apparatus having means to rotate the work piece, either steadily or intermittently, through a desired angle or at a prescribed rate of speed while still being capable of preventing undesired spinning thereof.

It is an object of this invention to provide a buffing conveyor which may be easily adapted to perform anyone of a number of specified operations.

It is yet another object of this invention to provide a buffing conveyor which may be readily adapted to cause the work piece to periodically rotate a desired number of degrees or, in the alternative, cause the work piece to constantly rotate at a predetermined speed as it passes adjacent the buffing apparatus.

These and other objects of this invention will be clearly understood by reference to the following specification and accompanying drawings in which:

FIG. 1 is a side-elevational view of the conveyor apparatus;

FIG. 2 is a plan view of the conveyor apparatus;

FIG. 3 is a cross-sectional view taken along line III—III of FIG. 2 omitting the conveyor chain linkage;

FIG. 4 is a perspective view of one end of the conveyor apparatus;

FIG. 5 is a perspective view of the conveyor chain links utilized in the conveyor apparatus;

FIG. 6 is a cross-sectional view taken along line VI—VI of FIG. 5;

FIG. 7 is a perspective view of the work support stem which is utilized in conjunction with the conveyor apparatus;

FIG. 8 is a perspective view of the turner which is utilized in conjunction with the conveyor apparatus;

Figure 9:
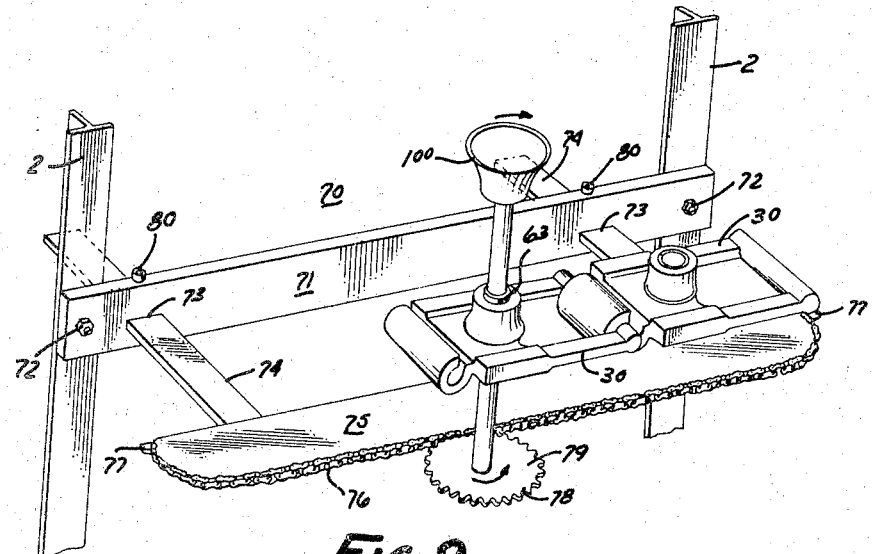
FIG. 9 is a perspective view showing the work piece rotating assembly which is utilized in conjunction with the conveyor apparatus.

Briefly, this invention comprises a conveyor apparatus having a pair of channel guide means spaced from each other along a given path and a conveyor chain having a plurality of links spanning the distance between the channel guide means and slidably supported thereby. The links are pivotally connected together in series and have work piece support means formed as an integral part thereof.

More particularly, this invention comprises an upstanding frame having channel-like guides for each side of the conveyor chain which is rotatably mounted thereon. Those surfaces of the links which run within the guide channels are sized in such a manner that they may be tightly but slidably fitted against bearing surfaces provided within the channel guide. A number of the links are provided with upstanding collars having cylindrical receiving apertures. These apertures receive work support stems in such a manner that these stems, and the work pieces which are mounted thereon, are free to rotate within the conveyor belt link.

In addition to the work piece, a spinning sprocket or a turner or both are selectively affixed to the work support stem. Means are provided for selectively engaging the spinning sprocket with a length of stationary chain which is affixed to the frame work of the buffing apparatus in such a manner that it may be selectively thrust into and withdrawn from meshing relationship with the passing spinning sprockets. Guide rail means are additionally provided on the frame-work of the machine may be selectively thrust into and withdrawn from engaging relationship with rectangularly offset bearing members or turners which are also affixed to the work support stem. Each time one of these turners approaches an engaged guide rail the work piece is rotated a predetermined fraction of revolution and thereafter retained in that position for the length of the guide rail.

Referring now to the figures a preferred embodiment of this invention will be described in detail. FIGS. 1 trough 4 illustrate the overall structural details of the buffing conveyor assembly which is the subject of this invention. The frame 1 is formed from a plurality of upstanding supports 2 having cross members 3 therebetween. A plurality of the resulting H-frame members are longitudinally aligned and the pair of conveyor chain channels 4 are affixed to the upper portion thereof. As seen best in FIG. 3, the conveyor chain channels 4 have planar bearing inserts on the inner faces thereof. Preferably, the planar side bearings 19 are adjustably mounted such that they may selectively narrow or widen the conveyor chain channels 18. A pair of L-shaped support members 6 are affixed to the lower part of the frame 1. These L-shaped angles serve as a conveyor chain return path. Planar bearings 7 are provided on the working face of each of the L-shaped angles 6 to protect the conveyor chain link from excess wear. Thus, there are two longitudinal paths formed by the buffer frame 1. These are the conveyor chain working paths 9 within which the chain links are rigidly but movably positioned on three sides and the conveyor chain return path 8 on which the conveyor chain link merely rides. The return path 8 and the working path 9 are unobstructed along their mid-sections such that elements may protrude from either side of the chain links without interfering with the free travel of the conveyor chain.

Extending from each extremity of the frame assembly 1 are sprocket support structures 10. An idler sprocket 12 and a drive sprocket 11, are rotatably mounted by means of bearings 15 in a well known manner within the support structures 10. Drive sprocket 11 has a series of drive spokes 14 extending radially therefrom. A series of support pads 13 are affixed to each of the drive spokes. Support pads 13 support the conveyor chain at the outer periphery of the drive sprocket. Similarly, idler wheel 12 has a plurality of idler spokes 17 extending radially therefrom. Idler spokes 17 also have a series of support pads 13 affixed thereto. Either the drive sprocket or the idler sprocket is preferably adjustably mounted within one of the sprocket support structures so that the tension on the conveyor belt chain may be selectively adjusted. In FIG. 1, a pair of tightener bolts 16 extend through the face of the support structure to the box in which bearing 15 is mounted. The bearing box is slidably mounted within the support structure. Thus, by selectively rotating the nut on the tightener bolt 16 idler sprocket 12 may be axially moved with respect to the conveyor frame.

Mounted within the conveyor frame is a prime mover 20 which is preferably connected to a variable speed drive 22 by means of belt 21. Variable speed drive 22 in the preferred embodiment of this invention incorporates a slip clutch which is effective to absorb the rotational thrust of prime mover 20 in the event that the conveyor chain assembly should become jammed. A speed chain 24 connects the output of the variable speed drive to the drive sprocket gear 23 (see FIG. 4). The prime mover 20 is mounted upon a platform 25 which may selectively be moved forward and backward with respect to the longitudinal axis of the machine. Such movement is effective to adjust the tension on the belt 21 connecting the prime mover to the variable speed drive. A similar adjustment arrangement 27 is provided to adjust the drive sprocket chain tension.

Referring now to FIGS. 5 and 6 the details of the conveyor chain links 30 will be described. The link 30 comprises a support rod 31 to which a pair of parallel runners 32 are rigidly affixed. A webbing 33 extends between the runners 32 at the end opposite from the support rod 31. Rising from the webbing 33 is an upstanding collar 34 having a cylindrical receiving portion 35 which preferably passes completely through the link. Conveniently, a bushing 36 may be pressed into cylindrical receiving portion 35 in order to simplify manufacturing techniques. Extending from the front of webbing 33 is a curve tongue 37. The tongue 37 is preferably circular in shape, as is the support rod 31, and is opeartive to engage the support rod 31 of a succeeding link. A support rod receiving slot 38 is provided at the upper extremity of the curved tongue 37. The rails 32 of the links 30 are provided with an expanded, substantially rectangular section 39 adjacent each side of the webbing 33. The surfaces 40, 41 and 42 of section 39 are preferably machined in such a manner that they may smoothly engage the planar bearings 5 and 19 within the conveyor chain channels 4.

Referring now to FIG. 7 there is shown in perspective view the work support shaft or stem 60. A shoulder or collar 63 is slidably positioned along the work support stem and is provided with a set screw 64 such that the collar 63 may be rigidly affixed to the work support stem at any point along its longitudinal axis. One end of the work support stem is tapped at 65 such that the work piece may conveniently be mounted thereto. Stem 60 is sized so as to rotatably fit into bushing 36 on link 30. Instead of collar 63 the stem may be expanded along a segment thereof in order to rotatably retain it in the bushing 36. Such techniques are well known in the art.

After the frame work of the machine has been assembled and the prime mover, variable speed drive, drive and idler sprockets and attendant linkage have been installed, a chain composed of links such as are shown in FIG. 5 is placed over the idler sprocket, along the conveyor return path, over the drive sprocket, and through the conveyor chain working path. The idler gear 12 is moved to the right as viewed in FIG. 1 by loosening tension adjustment 16 and the end chain links are joined. The idler gear 12 is then moved to the left as viewed in FIG. 1 by tightening tension adjustment 16 until the desired degree of tension is attained. Planar adjustments 18 are then selectively tightened along the length of the conveyor assembly until the planar side bearings 19 bear against the machined surfaces 41 of the links 30 a sufficient amount to prevent any sideways movement of the links when the buffer strikes the work piece. In addition to the planar side bearings 19 the conveyor chain links 30 are also borne within the conveyor chain working path by the horizontal planar bearings 5 which bear again the machine surfaces 40 and 42 on the conveyor chain links. The result of such bearing support is to rigidly affix each conveyor chain link within a horizontal plane while still allowing it to move within that plane.

The tension on drive sprocket gear chain 24 is then adjusted by moving the variable speed drive 22 to the left as viewed in FIG. 1 by adjustment 27. A similar adjustment is made with regard to the prime mover by means of crank assembly 26. A number of work support stems are then placed within bushings 36 in the links 30. The work support stems are vertically positioned by means of collars 63. The work pieces are affixed to work piece support stems 60 by utilizing the tapped aperture 65. Buffing machines are placed in predetermined positions along the path of travel of the work piece and the conveyor chain is then rotated by actuating the prime mover 20. The work pieces may be removed from the conveyor belt after they have passed through all of the buffing machines. Note that it is not necessary to remove the work support stems as they pass between the supports 6 in the conveyor chain return path. Note also, that sufficient clearance is provided between the support paths 13 on the drive and idler sprockets and the inner structure of the idler sprockets to allow the work support stem to pass completely through the conveyor link 30 and extend downward for a considerable distance. The purpose of this structure will become apparent hereinafter.

Referring now to FIG. 8 there is shown a turning mechanism indicated generally at 50 which comprises a cylindrical receiving sleeve 51 having a stem receiving aperture 52 running through the center thereof. A series of threaded apertures 53 are provided within the sleeve such that set screws may be inserted therein to non-rotatably grasp a work support stem inserted through stem receiving aperture 52. Alternatively or additionally, any well known keying arrangement may be utilized. A pair of axially spaced rectangular bearing members 54 and 55 are mounted on sleeve 51. The rectangular bearing members 54 and 55 have machined surfaces along their opposite longitudinal surfaces indicated generally at 56. Preferably, the turning mechanism is cast as one piece, cylindrical receiving sleeve 51 is bored therein, and bearing members 54 and 55 are machined. Such construction insures both the accuracy and rigidity of the turning mechanism. The function of the turner 50 will be discussed hereinafter with particular reference to FIG. 10.

Referring now to FIG. 9 the work piece rotating assembly 70 will be described in detail. A lateral support 71 is affixed between upstanding supports 2 by any satisfactory means such as bolts 72. Lateral support 71 is provided with a pair of guide slots 73 positioned as shown. A pair of support arms 74 pass through guide slots 73. The width of lateral support 72 and the tolerance of mating guide slots 73 and support arms 74 must be such that the support arms are rigidly positioned in a plane parallel to that of the conveyor chain working path 9 and the conveyor chain return path 8. Affixed to support arms 74 is a rotator chain support plate 75. A stationary rotator chain 76 is affixed to the outer periphery of support plate 75 by means of pin 77 in the manner shown.

When work piece rotating assembly 70 is utilized in a particular buffing operation a rotator sprocket 78 is affixed to the work support stem in the manner shown. The work support stem 60 is passed through the bushing 36 in conveyor chain link 30 until collar 63 abuts the upper surface thereof. As the buffing apparatus is operated the conveyor chain links 30 move longitudinally along the working path 9. As desired, the work piece rotating assembly may be activated by sliding support arms 74 to an inward position as shown in FIG. 9 in which stationary rotator chain 76 is operative to engage the teeth of rotator sprocket 78 as it passes thereby. Cap screws 80 are then tightened to secure the support arms in this position. As each work support stem having a rotator gear thereon passes adjacent the stationary rotator chain, it will begin to rotate in the direction indicated at 79. Since the rotator sprocket is non-rotatably affixed to the work support stem, the work piece will also rotate. This rotation will continue until such time as the rotator sprocket traverses the entire length of the stationary rotator chain.

Figure 10:
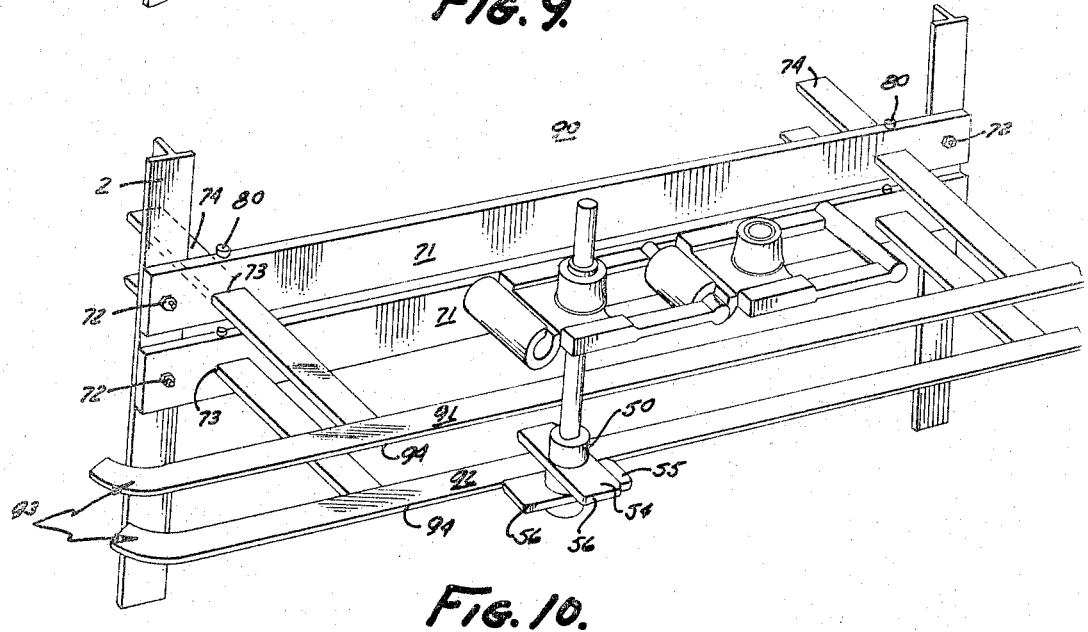
FIG. 10 is a perspective view of the work piece turner and retaining assembly which is utilized in conjunction with the conveyor apparatus.

FIG. 10 shows a work piece turner and retaining assembly indicated generally by the reference numeral 90. The supporting structure for the work piece turning and retaining assembly is similar to that utilized with the work piece rotating assembly 70 except that two lateral supports 71 with attendant support equipment are necessary. Affixed to the interior extremity of support arms 74 is an upper guide and turning rail 91 and a lower guide and turning rail 92. The rails 91 and 92 are provided with curved extremities as indicated in the figure at 93. The turner 50 is affixed to the work support stem in a manner similar to that described in connection with the rotator sprocket 78 in the work piece rotating assembly 70. The vertical spacing of lateral supports 71 in FIG. 10 is such that the planar bearing surfaces 94 of the upper and lower rails are at the same height as the bearing surfaces 56 in the upper and lower rectangular bearing members 54 and 55 on the turner 50.

When it is desired to operate the work piece turner and retainer assembly 90 one of the guide rails 91 or 92 is thrust into the path of the passing turners 50 such that the respective bearing surfaces of the rail and turner slidably abut. As the turner 50 approaches the curved end section 93 of the guide rail it is rotated through an angle of 90 degrees assuming the turner had just departed from the upper rail. The guide rail 92 is positioned such that once turning is effected the planar bearing surface 94 closely abuts the machined surface 56 of rectangular bearing member 55 and thus prevents further rotation of the work piece during the time interval that the particular conveyor chain link is passing by the work piece turner and retainer assembly.

The work piece rotating assembly 70 and the work piece turning and retaining assembly 90 may be selectively positioned at various points along the length of the buffing conveyor apparatus. In those operating circumstances where the same type of work piece 100 is being buffed continuously it may be desirable to permanently affix the support arm 74 to the frame of the machine. Assuming such a program, it would also be desirable to utilize only one of the upper and lower guide rails in connection with a given section of the conveyor apparatus.

Note that where both the work piece rotating assembly 70 and the work piece turner and retaining assembly 90 are utilized on the same machine it is necessary to provide three discrete engagement levels—i.e., one for engagement of the stationary rotor chain 76 with rotator sprockets 78, one for engagement of upper guide rail with upper rectangular bearing member 54, and one for engagement of the lower guide rail 92 with the lower rectangular bearing member 55. In this particular case each of the work support stems might have both a turner 50 and a rotator sprocket 70 affixed thereto. Alternatively, it is possible to program the conveyor apparatus in such a manner that different types of work pieces may be interspersed. This is accomplished by utilizing a turn with one particular type of work piece and utilizing a rotator sprocket with another type of work piece. In any event, the drive spokes 14 and the idler spokes 17 must extend radially from their respective sprockets a sufficient distance to allow the components positioned below the links on the work support stems to pass therebetween without striking either of the sprocket hubs. As previously pointed out the construction of the working and return paths is such as to permit these components to pass in unobstructed fashion.

While the rotating assembly 70 and the work piece turner and retaining assembly 90 are shown mounted below the plane of the conveyor chain working path, it will be readily apparent to those skilled in the art that they could just as well be mounted above that plane. In such a case the rotator sprocket 78 or the turner 50 would be positioned between the top of bushing 36 and the work piece. Similarly, the rotating assembly 70 may be mounted below the plane of the conveyor chain working path 9 while a work piece turner and retaining assembly 90 is mounted above that plane.

It should also be noted that while turner 50 has been shown as having only two rectangular bearing members 54 and 55 it is within the concept of this invention to provide a larger number of such bearing members. Additional bearing members would be added in similarly axial spaced relationship to the sleeve 51. This would be necessitate the provision of additional guide rails at different levels. For example, if three equally radially spaced rectangular bearing members were utilized, it would be possible to selectively rotate the work piece an angle of 60 degrees instead of 90 degrees. Note also that by placing either the work piece rotating assembly 70 or the work piece turner and retaining assembly 90 on the opposite side of the conveyor assembly it is possible to reverse the direction of turning or rotation.

Thus, the multi-purpose buffing conveyor would in reality have spaced holes or some type of retaining means at each of the upstanding support members 2 in such a manner that through the simple process of affixing uide rails and stationary rotor chains at desired locations a given buffing program could be executed. Obviously, a myriad of possible combinations, and thus buffing programs, are possible through the selective positioning of the work piece rotating assembly, the work piece turner and retaining assembly, and the rotator sprockets and turners.

It will further be obvious that while a slot and support arm system utilizing cap screws 80 is shown for selectively inserting and retracting the operating members 76, 91 and 92, a simple cam system could be provided which would allow selective insertion or retraction in one motion, thus obviating the necessity for cap screws 80. Such possible modifications will be readily apparent to those skilled in the art.

Figure 11:
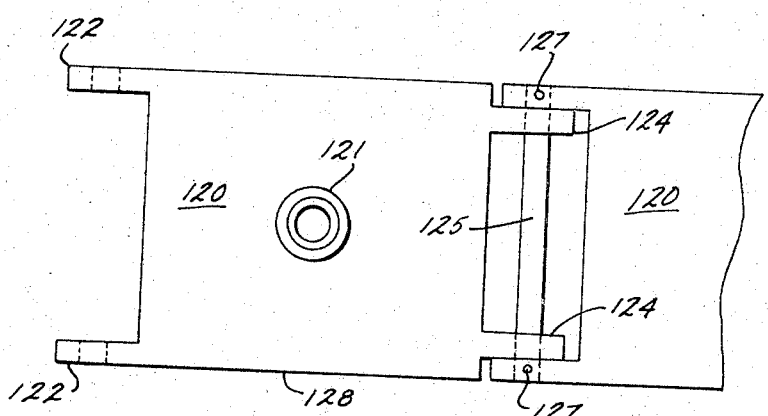
FIG. 11 is a plan view showing a pair of connected modified conveyor chain links.
Figure 12:
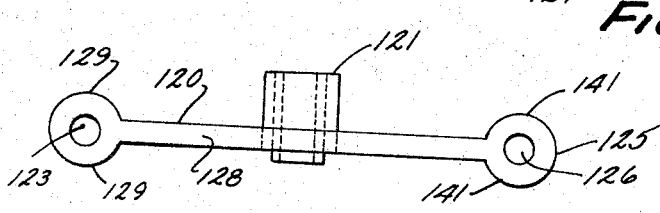
FIG. 12 is a side view of the modified conveyor chain link.
Figure 13:
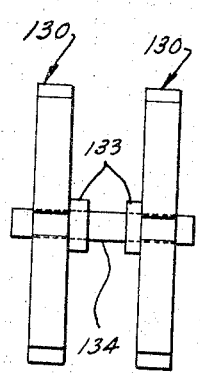
FIG. 13 is a plan view of a modified drive and idler sprocket for the buffing conveyor.

Referring now to FIGS. 11 and 12 a modified embodiment of the conveyor chain link will be illustrated. The modified conveyor chain link consists of a planar webbing 120 having a cylindrical stem receiving aperture 121 affixed thereto. A pair of vertically expanded, generally cylindrical, pin-receiving sleeves extend from each extremity of webbing 120 as viewed best in FIG. 11. Pin receiving sleeves 122 are flush with the outside edges of webbing 120 while pin receiving sleeves 124 are inset a distance equal to the width of each pin receiving sleeve 122 such that they will mate therewith as shown in FIG. 13. The links are connected by inserting a pin 125 through aligned apertures 123 and 126. Conveniently, the pin may be retained in place by a pair of set screws 127. The pin is sized such as to terminate flush with the outside edges of expanded cylindrical sections 122.

In order to provide vertical and lateral stabilization of the conveyor chain formed from the modified links shown in FIG. 11 and 12, the sides 128 of the link including the sleeve and pin ends, are machined to provide a smooth bearing surface therealong. The links are utilized in the same type of channel framework shown in FIG. 3. The planar side bearings are adjusted by rotating studs 18 until they tightly but slidably abut machined surface 128. The upper and lower planar bearing surfaces of the conveyor channel 9 are sized so as to closely but slidably engage the upper and lower surfaces 129 and 141 on the expanded cylindrical pin receiving stems 122 and 124. Preferably, sleeves 124 are of a slightly smaller outer radius than sleeves 122 since such sizing facilitates vertical stabilization within the channel guides. When the sleeves are so sized, only sleeves 122 are stabilized by the upper and lower planar bearing surfaces. These sleeves, in turn, stabilize sleeves 124 and thus the entire link by forces transmitted through the pin 125. Of course, the axis of all of the sleeves lie as nearly as possible in one plane. It has been found that it is not necessary to machine surfaces 129 as they will wear to the correct dimensions within a short time after the machine has been run.

Figure 14:
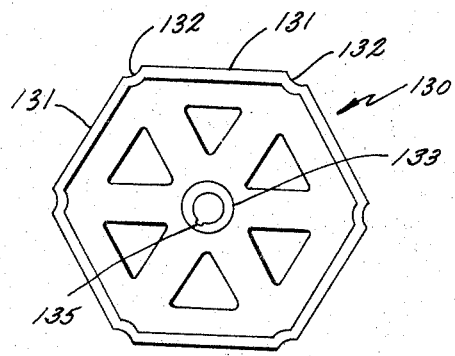
FIG. 14 is a side-elevational view of the modified drive and idler sprocket.

Referring now to FIGS. 13 and 14 a modified form of the drive and idler sprockets will be illustrated. The modified sprocket is comprised of a pair of polygonal plates 130 having an arc-like notch 132 at the apex of adjacent sides 131. The distance between the notches 132 is equal to the distance between tongues 37 as shown in FIG. 5. The radius of the arc-like notches 132 is equal to that of tongue members 37. The side plate has a hub 133 and a key receiving slot 135. Two of these side plates are keyed to a shaft 134 as shown best in FIG. 13. Preferably, the hubs are turned inwardly so that buffing machine may be kept as narrow as possible. The outer ends of shaft 134 are borne in the bearing blocks in a manner identical to that described in connection with the drive and idler sprocket shown in FIG. 1.

The modified drive and idler sprocket arrangement shown in FIGS. 13 and 14 is often preferably over that shown in FIG. 1 because of the ease with which a relatively large access path may be provided for the turner mechanism and spinning gear when they are positioned below the buffing conveyor chain. The modified embodiment also has a tendency to run quieter than the embodiment shown in FIG. 1.

Thus it will be seen that this invention has provided a buffing conveyor assembly which can effectively control the vertical and radial position of the work piece at any point along the conveyor assembly. Although a preferred embodiment has been described in detail, it should be understood that the invention is not limited to the exact details of the embodiment described and that all devices coming within the spirit of this invention are to be covered by this patent unless the claims expressly state otherwise.

I claim:
1. A conveyor apparatus comprising:
 a conveyor chain support formed from a plurality of aligned upstanding supports and two elongated generally U-shaped channel guides, said guides being affixed to said uprights in parallel spaced relationship with their open channels facing to form a conveyor chain working path;
 drive and idler sprockets rotatably mounted at opposite ends of said support, said sprockets being aligned such that their upper chain-bearing peripheries approximate the plane of said working path;
 a return track supported by said uprights and positioned such that its upper conveyor chain bearing surface approximates the plane of the lower chain abutting peripheries of said drive and idler sprockets, said return track having an unobstructed midsection throughout its entire length;
 a continuous conveyor chain having a plurality of links passing around and meshing with said drive and idler sprockets, said links spanning the distance between the channel guides and each having a section on opposite sides thereof which is sized so as to slide within each channel guide with relatively close tolerance;
 adjustable planar bearings mounted within said channel guides, said bearings adapted to restrict the play in said conveyor chain when properly adjusted;
 means for rotating said drive sprocket;
 upstanding collars affixed to at least some of said links, said collars having stem receiving apertures; and
 work support stems rotatably mounted in some of said collars.

2. The combination as set forth in claim 1 in which said drive and idler sprockets have means for allowing said work support stems to extend through said upstanding collars and thus through said links without interfering with the positioning of the conveyor chain thereon and said conveyor chain working path is free from obstruction along its entire midsection such that said work support stems may likewise extend without interfering with the stability of said conveyor chain in said working path.

3. A conveyor apparatus comprising:
 a conveyor chain support formed from a plurality of aligned upstanding supports and two continuous elongated guides, said guides being affixed to said uprights in parallel spaced relationship, each of said guides having a lower track member and side retaining wall oriented in facing fashion so as to form a conveyor chain working path having an open central portion;
 drive and idler sprockets rotatably mounted at opposite ends of said support, said sprockets being aligned such that their upper chain-bearing peripheries approximate the plane of said working path;
 a return track supported by said uprights and positioned such that its upper conveyor chain bearing surface approximates the plane of the lower chain abutting peripheries of said drive and idler sprockets, said return track having an unobstructed midsection throughout its entire length;

a continuous conveyor chain having a plurality of individually rigid links flexibly connected to one another, said chain passing around and meshing with said drive and idler sprockets, said links rigidly spanning the distance between said retaining walls and slidably resting on said track members, said links being sized so as to slide between said walls with relatively close tolerance;

means for rotating said drive sprocket;

upstanding collars affixed to at least some of said links, said collars having stem receiving apertures; and work support stems rotatably mounted in some of said collars.

4. The combination as set forth in claim 3 which further comprises:

a turner having a stem receiving sleeve, a first generally rectangular bearing member mounted on said sleeve such that it is perpendicularly disposed to the longitudinal axis of said sleeve, a second generally rectangularly bearing member mounted on said sleeve such that it is perpendicularly disposed to the longitudinal axis of said sleeve, said second bearing member being longitudinally spaced from said first bearing member and rotated with respect thereto;

means mounting said turner to one of said work support stems;

at least one guide and turning rail having a longitudinal bearing surface adapted to turn and slidably abut said first rectangular bearing member; and means affixed to said support for supporting said guide and turning rail in the plane defined by said first rectangular bearing member when said conveyor chain is rotated, said means allowing said guide and turning rail selectively to be placed into and withdrawn from abutting relationship with the path of said first rectangular bearing member.

5. The combnation as set forth in claim 4 which further comprises:

a second guide and turning rail having a longitudinal bearing surface adapted to turn and slidably abut said second rectangular bearing member; and means affixed to said support for supporting said second guide and turning in the plane defined by said second rectangular bearing member when said conveyor chain is rotated, said means allowing said second guide and turning rail selectively to be placed into and withdrawn from abutting relationship with the path of said second rectangular bearing member.

6. The combination as set forth in claim 3 which further comprises:

a rotator sprocket affixed to at least one of said support stems;

a length of rotator chain;

means non-rotatably supporting said length of rotator chain substantially parallel to and adjacent the path of movement of said rotator sprocket when said conveyor chain is rotated, said rotator chain extending adjacent said rotator sprocket path for a considerable distance and adapted to mesh with and continually rotate said rotator sprocket when it passes thereby, said means allowing said length of rotator chain to be selectively placed into and withdrawn from abutting relationship with the path of said rotator sprocket.

7. The combination as set forth in claim 6 which further comprises:

a turner having a stem receiving sleeve, a first generally rectangular bearing member mounted on said sleeve such that it is perpendicularly disposed to the longitudinal axis of said sleeve, a second generally rectangular bearing member mounted on said sleeve such that it is perpendicularly disposed to the longitudinal axis of said sleeve, said second bearing member being longitudinally spaced from said first bearing member and rotated with respect thereto;

means mounting said turner to one of said work support steps;

at least one guide and turning rail having a longitudinal bearing surface adapted to turn and slidably abut said first rectangular bearing member; and means affixed to said support for supporting said guide and turning rail in the plane defined by said first rectangular bearing member when said conveyor chain is rotated, said means allowing said guide and turning rail selectively to be placed into and withdrawn from abutting relationship with the path of said first rectangular bearing member.

8. In a conveyor apparatus having a continuous conveyor chain with a plurality of links rotatably mounted on a frame, a plurality of upstanding collars affixed to at least some of said links, said collars having cylindrical receiving apertures, work support stems rotatably mounted in at least certain of said collars, and means for rotating said conveyor chain, the combination comprising:

rotator sprockets affixed to selected ones of said work support stems;

means non-rotatably supporting a length of rotator chain substantially parallel to and adjacent the path of movement of said rotator sprockets when said conveyor chain is rotated, said rotator chain adapted to mesh with said rotator sprockets when they pass thereby and continuously rotate said rotator sprockets; and means for selectively positioning said length of rotator chain into and selectively retracting said length of rotator chain out of meshing relationship with the passing rotator sprockets.

9. In a conveyor apparatus having a continuous conveyor chain with a plurality of links rotatably mounted on a frame, means for rotating said conveyor chain, a plurality of upstanding collars having cylindrical receiving apertures affixed to at least some of said links, work support stems rotatably mounted in a least certain of said collars, and, at least one integrally cast turner affixed to one of said stems, said turner comprising:

a stem receiving sleeve;

means for non-rotatably affixing said sleeve to the stem;

a first generally rectangular bearing member mounted on said sleeve, said first member being perpendicularly disposed to the longitudinal axis of said sleeve;

a second generally rectangular bearing member mounted on said sleeve, said second member being longitudinally spaced from said first member and rotated with respect thereto, said second member being perpendicularly disposed to the longitudinal axis of said sleeve.

10. The combination as set forth in claim 9 which further comprises:

a plurality of guide and turning rails having longitudinal bearing surfaces adapted to abut said rectangular bearing surfaces;

means affixed to said frame for supporting said guide and turning rails in the planes defined by said rectangular bearing surfaces when said chain is rotated and abutting said rectangular bearing surfaces as they pass by said rails.

11. The apparatus as set forth in claim 10 in which said supporting means further comprises means allowing said guide and turning rails to be selectively withdrawn from abutting relationship with the paths of said rectangular bearing members.

12. The combination as set forth in claim 10 in which said guide and turning rails incorporate means at their extremities for assisting positive rotation through a desired arc of said turners as said turners approach and contact said guide and turning rails.

13. A conveyor chain link comprising:
a support rod;
first and second parallel rails extending from and affixed to each end of said support rod and perpendicular thereto;
a web connecting the ends of said rails opposite from said support rod;
an upstanding stem receiving collar affixed to said web, said collar having a cylindrical receiving portion whose longitudinal axis is perpendicular to the general plane formed by said support rod, said runners, and said web;
a curved tongue extending generally from the end of said web which is opposite from said support rod, said tongue adapted to engage the support rod of a similar link.

14. The apparatus as set forth in claim 13 in which said rails have opposite segments of their lengths of larger cross section than the remainder of said rails, said opposite segments lying adjacent said web.

15. The apparatus as set forth in claim 14 in which said opposite segments of said rails are substantially rectangular in cross section.

16. The combination as set forth in claim 15 in which said opposite segments are machined to form a bearing surface on at least two of their exterior sides.

17. A conveyor apparatus comprising:
a conveyor chain support formed from a plurality of aligned uprights and two elongated generally U-shaped channel guides, said guides being affixed to said uprights in parallel spaced relationship with their open channels facing;
a drive sprocket rotatably mounted at one end of said support;
an idler sprocket rotatably mounted at the other end of said support;
said drive and idler sprockets being aligned such that their upper chain bearing peripheries approximate the plane of said channel guides;
a return track supported by said uprights and positioned such that its upper surface approximates the plane of the lower chain abutting peripheries of said drive and idler sprockets;
a continuous conveyor chain having a plurality of links passing around and meshing with said drive and idler sprockets, the width of said links approximating the distance between the interior faces of said channel guides and having opposite segments of their rails sized so as to slide between the legs of said channel guides with relatively close tolerances;
upstanding collars affixed to at least some of said links, said collars having cylindrical stem receiving apertures;
work support stems rotatably mounted in at least certain of said collars;
means for rotating said driving sprocket;
rotator sprockets mounted to certain of said stems;
turners affixed to certain of said stems;
means non-rotatably supporting a length of rotator chain adapted to mesh with said rotator sprockets when they pass thereby and continuously rotate certain of said rotator sprockets, said means being capable of selectively placing said length of rotator chain into and retracting said length of rotator chain out of meshing relationship with passing rotator sprockets; and
means supporting a guide rail adapted to abut said turners when they pass thereby, and thus rotate certain of said stems through a fixed angle and maintain the new position for a predetermined distance, said means being capable of selectively placing said guide rail into and out of abutting relationship with the path of said turners.

18. In a conveyor apparatus having a pair of facing guide and support means, a link comprising:
a web section;
an upstanding stem receiving collar affixed to said web section, said collar having a cylindrical receiving portion whose longitudinal axis is perpendicular to the general plane of said web section;
means for pivotably connecting said link to an identical link; and
means rigidly affixed to each side of said web section to be slidably received by said pair of facing guide means whereby said web section and said affixed means cooperate to slidably but rigidly span the distance between said pair of facing guide means, said affixed means having a first pair of cylindrical sleeves affixed to each side of one end of said web section, said first pair terminating flush with the sides of said web section, and a second pair of cylindrical sleeves affixed to the other end of said web, each of said second pair being inset from each side of said web section a distance at least equal to the width of each of said first pair.

19. The apparatus as set forth in claim 18 wherein said second pair of sleeves have an outer radius of curvature less than that of said first pair of sleeves.

20. A conveyor apparatus comprising:
a conveyor chain support formed from a plurality of aligned upstanding supports and two elongated generally U-shaped channel guides, said guides being affixed to said uprights in parallel spaced relationship with their open channels facing to form a conveyor chain working path;
drive and idler sprockets rotatably mounted at opposite ends of said support, said sprockets being aligned such that their upper chain-bearing peripheries approximate the plane of said working path;
a return track supported by said uprights and positioned such that its upper conveyor chain bearing surface approximates the plane of the lower chain abutting peripheries of said drive and idler sprockets, said return track having an unobstructed midsection throughout its entire length;
a continuous conveyor chain having a plurality of links passing around and meshing with said drive and idler sprockets, said links spanning the distance between the channel guides and each having a section on opposite sides thereof which is sized so as to slide within each channel guide with relatively close tolerance;
means for rotating said drive sprocket, said means transmitting rotational thrust to said drive sprocket by means of a variable speed drive incorporating slip clutch means for preventing damage in the event of jamming;
upstanding collars affixed to at least some of said links, said collars having stem receiving apertures; and
work support stems rotatably mounted in some of said collars.

21. A conveyor apparatus comprising:
a conveyor chain support formed from a plurality of aligned upstanding supports and two elongated generally U-shaped channel guides, said guides being affixed to said uprights in parallel spaced relationship with their open channels facing to form a conveyor chain working path;
drive and idler sprockets rotatably mounted at opposite ends of said support, said sprockets being aligned such that their upper chain-bearing peripheries approximate the plane of said working path, one of said drive and idler sprockets incorporating a tension adjusting means whereby the tension on said conveyor chain may be regulated;
a return track supported by said uprights and positioned such that its upper conveyor chain bearing surface approximates the plane of the lower chain abutting peripheries of said drive and idler sprockets, said return track having an unobstructed midsection throughout its entire length;

a continuous conveyor chain having a plurality of links passing around and meshing with said drive and idler sprockets, said links spanning the distance between the channel guides and each having a section on opposite sides thereof which is sized so as to slide within each channel guide with relatively close tolerance;

means for rotating said drive sprocket;

upstanding collars affixed to at least some of said links, said collars having stem receiving apertures; and work support stems rotatably mounted in some of said collars.

References Cited

UNITED STATES PATENTS 2,194,050  3/1940  Moscini _____ 51—76
2,469,681  5/1949  Coby.

EVON C. BLUNK, *Primary Examiner.*
A. C. HODGSON, *Assistant Examiner.*

UNITED STATES PATENT OFFICE
Certificate of Correction

Patent No. 3,337,024                                      Patented August 22, 1967

Joseph F. Gilewski

Application having been made by Joseph F. Gilewski, the inventor named in the patent above identified; and Ray E. Teter of Lake Leelanau, Michigan, for the issuance of a certificate under the provisions of Title 35, Section 256 of the United States Code, adding the name of the said Ray E. Teter as a joint inventor, and a showing and proof of facts satisfying the requirements of the said section having been submitted, it is this 16th day of July 1968, certified that the name of the said Ray E. Teter is hereby added to the said patent as a joint inventor with the said Joseph F. Gilewski.

[SEAL]

EDWIN L. REYNOLDS,
*First Assistant Commissioner of Patents.*